(12) United States Patent
Suzue et al.

(10) Patent No.: US 6,199,315 B1
(45) Date of Patent: Mar. 13, 2001

(54) METHOD AND APPARATUS FOR CATCHING FLEAS

(75) Inventors: Mitsuyoshi Suzue; Masaharu Kamei; Masaru Nishikawa; Masaru Tanouchi, all of Tokushima (JP)

(73) Assignee: Earth Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/284,872
(22) PCT Filed: Aug. 25, 1998
(86) PCT No.: PCT/JP98/03775
§ 371 Date: Apr. 22, 1999
§ 102(e) Date: Apr. 22, 1999
(87) PCT Pub. No.: WO99/09818
PCT Pub. Date: Mar. 4, 1999

(30) Foreign Application Priority Data

Aug. 25, 1997 (JP) ................................... 9-228360
Apr. 14, 1998 (JP) ................................. 10-102818
May 15, 1998 (JP) ................................. 10-133782

(51) Int. Cl.[7] .............................. A01M 1/04; A01M 1/14
(52) U.S. Cl. ................................................ 43/113; 43/114
(58) Field of Search ........................................ 43/113, 114

(56) References Cited

U.S. PATENT DOCUMENTS

| | | | | |
|---|---|---|---|---|
| 670,996 | * | 4/1901 | Morgan | 43/113 |
| 1,723,919 | * | 8/1929 | Bykowy | 43/113 |
| 4,074,457 | * | 2/1978 | Sato et al. | 43/113 |
| 4,566,220 | * | 1/1986 | Justice | 43/113 |
| 4,654,998 | * | 4/1987 | Clay | 43/113 |
| 4,918,856 | * | 4/1990 | Olive et al. | 43/113 |
| 5,203,816 | * | 4/1993 | Townsend | 43/114 |
| 5,231,790 | * | 8/1993 | Dryden et al. | 43/113 |
| 5,353,542 | | 10/1994 | Vaudry | 43/113 |
| 5,513,465 | * | 5/1996 | Demarest et al. | 43/113 |
| 5,722,199 | * | 3/1998 | Demarest et al. | 43/113 |
| 5,896,695 | * | 4/1999 | Walker | 43/113 |

FOREIGN PATENT DOCUMENTS

| | | | |
|---|---|---|---|
| 367539 | * | 5/1990 | (EP) .................................. 43/113 |
| 2171882 | * | 9/1986 | (GB) .................................. 43/113 |
| 2275409 | * | 8/1994 | (GB) .................................. 43/113 |
| 6-54635 | | 3/1994 | (JP) . |
| 7-507690 | | 8/1995 | (JP) . |

* cited by examiner

*Primary Examiner*—Darren W. Ark
(74) *Attorney, Agent, or Firm*—Sughrue, Mion, Zinn, Macpeak & Seas, PLLC

(57) ABSTRACT

The present an invention can provide effective and excellent flea catching method and apparatus which can attract and catch fleas living in the life space of human beings at a high efficiency without harming the living environment of human beings.

The present invention relates to a flea catching method which comprises emitting from a light source light effective for attracting fleas so that the flea catching zone is irradiated with light from the light source in such a manner that even points apart from the end of a catching means at the maximum moving distance made by one leap of a flea have an illuminance effective for attracting fleas, whereby the fleas thus attracted to the light source can be caught by the catching means. The present invention also relates to an apparatus for catching a flea which comprises a light source capable of emitting light effective for attracting fleas, and a catching portion having an adhesive surface which slopes downward from the side thereof at which the light source is disposed, wherein the flea catching zone is irradiated with light from the light source in such a manner that even points apart from the end of the catching means at the maximum moving distance made by one leap of a flea have an illuminance effective for attracting fleas.

6 Claims, 10 Drawing Sheets

METHOD AND APPARATUS FOR CATCHING FLEAS

TECHNICAL FIELD

The present invention relates to a method and apparatus for catching fleas living in the living environment of human being. More particularly, the present invention relates to a flea catching method which comprises effectively attracting and catching fleas which are parasitic on animals such as dog and cat and an apparatus therefor.

BACKGROUND OF THE INVENTION

As methods for killing fleas living in the living environment of human being there have been heretofore used an insecticidal method using an insecticide and a method which comprises attracting fleas to light, and then catching them.

The former method using an insecticide is disadvantageous in that the insecticide used remains indoor or may harm pets. This method is also disadvantageous in that it takes time to use such an insecticide.

On the other hand, the latter method which comprises attratcing fleas to light, and then catching them is desirable in that it is free from the disadvantageous of the former method.

As a proposed method which comprises attracting fleas to light, and then catching them there has heretofore been known a method which comprises attracting fleas to light from a miniature bulb disposed above a tray, and then catching them by an adhesive sheet attached to the bottom of the tray. There has also been known a flea attracting catcher comprising a catcher having an adhesive sheet and a chemical illuminant provided thereabove.

However, these techniques leave something to be desired in the effect of attracting/catching fleas.

It is therefore an object of the present invention to eliminate the difficulties of the foregoing prior art techniques. More particularly, the object of the present invention is to provide a flea catching method which can effectively attract and catch fleas living in the life space of human being at a high efficiency without harming the living environment of human being and an apparatus therefor.

SUMMARY OF THE INVENTION

The inventors made extensive studies of conditions under which fleas can be fairly attracted to light and caught. As a result, it was found that the foregoing object of the present invention can be accomplished by the following methods and apparatus:

(1) A method for catching a flea, which comprises a step of preparing a light source and a catching means, a step of emitting light effective for attracting fleas from said light source, a step of irradiating the flea catching zone with light from said light source in such a manner that at least one point apart from the end of said catching means at the maximum moving distance made by one leap of a flea has an illuminance effective for attracting fleas, and a step of catching fleas which have been attracted to light from the light source by said catching means.

(2) The method for catching a flea according to the above item (1), which comprises a step of allowing light from the light source to be reflected by a reflective surface, and a step of irradiating the flea catching zone with light from the light source and light reflected by the reflective surface in such a manner that at least one point apart from the end of the catching means at the maximum moving distance made by one leap of a flea has an illuminance effective for attracting fleas.

(3) The method for catching a flea according to the above item (1) or (2), wherein the light source comprises a high brightness-light emitting diode and light from the high brightness-light emitting diode has a luminous intensity of not less than 0.3 [cd] and a main wavelength of from 400 to 600 nm.

(4) An apparatus for catching a flea which comprises a light source capable of emitting light effective for attracting fleas, and a catching portion having an adhesive surface which slopes downward from the side thereof at which the light source is disposed, the catching portion being disposed on a flea catching zone along the direction of irradiation with light from the light source, wherein the flea catching zone is irradiated with light from the light source in such a manner that at least one point apart from the end of the catching means at the maximum moving distance made by one leap of a flea has an illuminance effective for attracting fleas, and a step of catching fleas which have been attracted to light from the light source by the catching means.

(5) The apparatus for catching a flea according to the above item (4), wherein the adhesive surface comprises a reflective surface which allows light from said light source to be reflected into the flea catching zone and the flea catching zone is irradiated with the reflected light together with light from the light source in such a manner that at least one point apart from the end of said catching means at the maximum moving distance made by one leap of a flea has an illuminance effective for attracting fleas.

(6) The apparatus for catching a flea according to the above item (4) or (5), wherein said light source comprises a high brightness-light emitting diode and light from the high brightness-light emitting diode has a luminous intensity of not less than 0.3 [cd] and a main wavelength of from 400 to 600 nm.

Preferred embodiments of the flea catching methods as described in the above items (1) to (3) according to the present invention will be described hereinafter.

The aforementioned method for catching a flea, wherein the reflective surface slopes towards the side reached by light from said light source.

The aforementioned method for catching a flea, wherein the angle of inclination of said reflective surface with respect to the installation surface is from 5 to 60°.

The aforementioned method for catching a flea, wherein the reflective surface is disposed below said light source and above the installation surface along the direction of irradiation with light from the light source.

The aforementioned method for catching a flea, wherein the light reflected by said reflective surface is effective for attracting fleas.

The aforementioned method for catching a flea, wherein the total reflectance of said reflective surface is not less than 50%.

The aforementioned method for catching a flea, wherein the catching means comprises at least one of an adhesive sheet and an electric insect killing device.

The aforementioned method for catching a flea, wherein the reflective surface is adhesive.

The aforementioned method for catching a flea, wherein the light source is allowed to go on and off.

The aforementioned method for catching a flea, wherein the flashing frequency of the light source is not more than 30 Hz.

Preferred examples of the flea catching apparatus as described in the above items (4) to (6) according to the present invention will be described hereinafter.

The aforementioned apparatus for catching a flea, wherein the angle of inclination of the reflective surface with respect to the installation surface is from 5 to 60°.

DETAILED DISCLOSURE OF THE INVENTION

Figure 1:
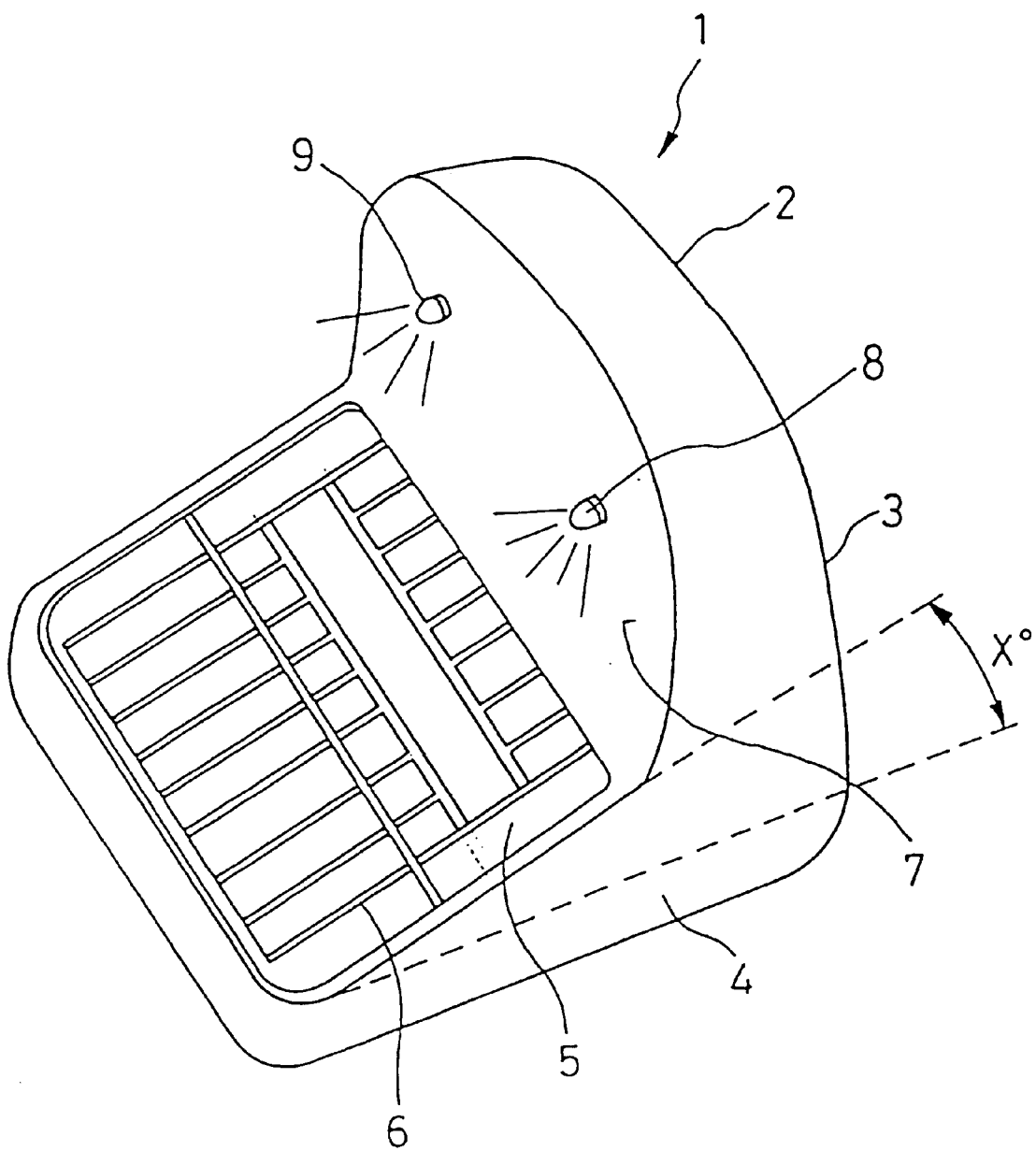
FIG. 1 is a perspective view illustrating an embodiment of the flea catching apparatus according to the present invention.

The aforementioned apparatus for catching a flea, wherein the total reflectance of the reflective surface is not less than 50%.

The inventors made extensive studies of improvements in the effect of attracting fleas to light and catching them. As a result, it was found that when the flea catching zone is irradiated with light from a light source in such a manner that at least a specific point thereon has an illuminance effective for attracting fleas, the fleas can be much effectively attracted towards a light source and then efficiently caught by a catching means.

In the present invention, it is thought that the irradiation with light from a light source and the foregoing specific point irradiated with light at an illuminance effective for attracting fleas bring forth a synergistic effect for intensely attracting fleas present not only close to but also far from the catching means and light source, towards the light source. Further, a flea which approaches the vicinity of the catching means, i.e., point from which it can reach the end of the catching means by one leap can be certainly attracted towards the light source because the point is irradiated with light at an illuminance effective for attracting fleas. Thus, the flea can reach the catching means by about one leap and can then be caught by the catching means.

In the present invention, by irradiating a specific point on the flea catching zone with light from a light source at a predetermined illuminance, even if the light source itself is not enlarged by using a reflector disposed behind the bulb or a light diffuser panel disposed in front of the bulb, fleas can be effectively attracted/caught. At the same time, the apparatus itself can be made compact. Thus, the apparatus of the present invention can be installed at a narrow space.

The term "flea catching zone" as used herein means the zone where fleas are to be caught by effecting the method and apparatus of the present invention. Examples of the flea catching zone include installation surfaces such as floor, carpet and tatami mat on which the catching means of the present invention is installed.

The specific point on the flea catching zone is a point apart from the end of the catching means at the maximum moving distance made by one leap of a flea. For example, the maximum moving distance made by a cat flea is from about 30 to 40 cm.

In the present invention, the flea catching zone is irradiated with light at points apart from the end of the catching means at the foregoing maximum moving distance at an illuminance effective for attracting fleas. However, all the points may be irradiated with light at an illuminance effective for attracting fleas. Alternatively, at least some of the points may be irradiated with light at an illuminance effective for attracting fleas. In this case, the points which are irradiated with light at an illuminance effective for attracting fleas are along the direction of irradiation with light from the light source. These points show the maximum illuminance in the foregoing flea catching zone.

Examples of the irradiation of the specific points with light from the light source include irradiation of these points with light emitted directly by the light source, irradiation of these points with light which has been emitted by the light source and then reflected by the reflective surface, and irradiation of these points with both the direct light and reflected light. In the present invention, these points are preferably irradiated with both the direct light and reflected light.

The illuminance for attracting fleas is preferably not less than 10 [lux], more preferably not less than 20 [lux], most preferably not less than 30 [lux].

The present invention is based on a new concept which has never been suggested or taught in the prior art. This new concept came from the biological characteristics of fleas that the flea catching zone is irradiated with light at specific points at an illuminance effective for attracting fleas.

In the present invention, the flea catching zone is irradiated with light at specific points at an illuminance effective for attracting fleas. However, it is preferred that light from the light source hit not only the specific points but also points farther from the light source than the specific points and/or points closer to the light source than the specific points along the direction of irradiation with light.

In the present invention, as the means of making the illuminance at the specific points in the flea catching zone effective for attracting fleas there may be used any means. In practice, however, there is preferably used a high brightness-light emitting diode as a light source (means (1)). Alternatively, there may be used light from the light source as well as light which has been emitted by a light source and then reflected by a reflective surface (means (2)). Alternatively, the foregoing two means (1) and (2) may be used in combination.

Preferred embodiments of the foregoing means (1) and (2) will be described hereinafter.

(1) Use of high brightness-light emitting diode as a light source

As the high brightness-light emitting diode employable herein as a light source there may be used one emitting light at a luminous intensity as remarkably high as not less than 0.3 [cd], preferably not less than 0.5 [cd], more preferably not less than 1 [cd]. The unit [cd] indicates candela, which is a unit of luminous intensity.

In the measurement of luminous intensity, the unknown intensity can be analogized by comparing the luminous intensity of unknown emission spectrum measured with that of emission spectrum having a known luminous intensity relatively. The luminous intensity of emission spectrum can also be calculated by the following equation:

$$\text{Luminous intensity[cd]}=\text{Illuminance[lux]}\times\text{Distance[m]}^2$$

The foregoing high brightness-light emitting diode preferably has a great illuminance. The term "illuminance" as used herein means brightness per unit area perpendicular to the direction of observation.

As the high brightness-light emitting diode there is preferably used one emitting light having a wavelength of from 400 to 600 nm, more preferably from 425 to 550 nm, most preferably from 450 to 525 nm. Particularly preferred wavelength ranges of light thus emitted are pure blue range at 450 nm and pure green range at 510 nm.

The foregoing emission wavelength indicates main wavelength and thus means the wavelength of peak in the emission spectrum of light. The light emitted by the light emitting diode used herein preferably has a narrow wavelength distribution in emission spectrum and thus has a high color purity. The light emitted by the light emitting diode used herein preferably is a monochromatic light having an emission spectrum pattern which is almost normally distributed with the main wavelength as a center.

The foregoing light emitting diode may always emit light but preferably goes on and off. In this manner, fleas can be attracted more efficiently. The flashing frequency is preferably not more than 30 Hz, more preferably not more than 20 Hz.

The duty ratio (ratio of ON time to one ON-OFF time) is preferably not more than 50%, more preferably not more than 10%. In this manner, the maximum allowable forward current value can be enhanced, making it possible to emit light of high luminous intensity for a prolonged period of time and hence further enhance the catching percent of fleas.

As mentioned above, the light emitting diode may be allowed to go on and off itself. Alternatively, a means of screening light such as shutter may be operated while the light emitting diode is being allowed to continuously emit light so that light comes on and off.

The color of light emitted by the light emitting diode seems to have something to do with the effect of attracting fleas and hence be preferably white or green. If two light emitting diodes are used, they may emit light of the same or different colors. For example, two light emitting diodes which emit white or green light may be used in combination. Alternatively, a light emitting diode which emits white light and a light emitting diode which emits green light may be used in combination. White light is composed of light of various colors in the visible light region. In the present invention, however, white light composed of emission spectrum of basic pure colors such as green and blue and emission spectrum of fluorescent color having a wavelength up to 600 nm such as yellow in combination is desirable.

In the present invention, two or more of the foregoing high brightness-light emitting diode may be used.

The use of a light emitting diode as a light source makes it possible to use dry battery over an extended period of time and hence save power. The use of such a light emitting diode makes it possible to use the apparatus free from chord and hence use the apparatus outdoor or in doghouse, cabinet, closet or the like. Thus, the apparatus can be installed in more areas. As the power supply for the foregoing light source there may be used a chargeable power supply.

The direction of irradiation of light from the high brightness-light emitting diode may be arbitrary so far as the aforementioned specific points are irradiated with light at an illuminance effective for attracting fleas. In practice, however, the direction of irradiation is preferably horizontal or slightly oblique downward to the installation surface.

In the means (1), as the light source there is used the foregoing high brightness-light emitting diode. Other conditions under which the foregoing high brightness-light emitting diode is used may be arbitrary so far as the foregoing specific points are irradiated with light at a predetermined illuminance.

(2) Irradiation with not only light from the light source but also light which has been emitted by the light source and then reflected by the reflective surface In the present invention, the flea catching zone is irradiated with light reflected by the reflective surface together with light from the light source in such a manner that at least one point apart from the end of the catching means at the maximum moving distance made by one leap of a flea has an illuminance effective for attracting fleas.

The luminous intensity of light reflected by the reflective surface is preferably great. Thus, the reflectance of the reflective surface is preferably high. In some detail, the total reflectance of the reflective surface [represented by (Luminous intensity of reflected light/Luminous intensity of light from light source)×100] is preferably not less than 50%, more preferably not less than 80%. The term "total reflectance" as used herein means the sum of specular reflectance and irregular reflectance (diffused reflectance). In the present invention, the reflective surface may irregularly reflect light.

The foregoing total reflectance [sum of specular reflectance and irregular reflectance (diffused reflectance)] can be measured by means of a goniophotometer.

The wavelength of reflected light may be either the same as or deviated from that of light from the light source so far as it can efficiently attract fleas.

In the present invention, the reflected light effective for attracting fleas has a wavelength and luminous intensity which can attract fleas. The wavelength and luminous intensity of the reflected light may be from 400 to 600 nm and not less than 0.15 [cd], respectively.

Examples of reflector having such a reflective surface include metals such as aluminum, copper, silver, gold, nickel, brass and chromium, and alloys thereof; reflectors comprising a substrate coated with these metals or alloys (mirror, etc.); inorganic materials of single crystals such as silicon oxide, titanium oxide, granite, lime-stone, marble, gypsum, glass, artificial ruby, artificial diamond and artificial emerald, and mixtures thereof; reflectors comprising a substrate coated with these materials; natural materials such as wood, silk, cotton and paper, and mixtures thereof; and reflectors comprising a substrate coated with these materials which satisfy the foregoing requirements.

Further examples of the reflector having such a reflective surface include those comprising a predetermined substrate coated with a resin such as low density polyethylene (LDPE), high density polyethylene (HDPE), polyethylene (PE), very low density polyethylene (VLDPE), ethylene-vinyl acetate copolymer (EVA), polyvinylidene chloride (PVDC), nylon (NY), oriented nylon (ONY), oriented polypropylene (OPP), unoriented polypropylene (CPP), polyethylene terephthalate (PET), polystyrene (PS) and ethylene-vinyl alcohol copolymer (EVOH) which satisfy the foregoing requirements.

Examples of the substrate employable herein include paper such as board and cardboard, resin sheet, metal plate, and glass.

Preferred among these reflectors are those comprising a board or resin sheet as a substrate coated with the foregoing material (e.g., metal material, inorganic material, natural material) and further coated with a resin such as LDPE, HDPE, PE, VLDPE, EVA, PVDC, PET and EVOH. More preferably, reflectors comprising a board as a substrate coated with the foregoing material and further coated with PET is used.

The foregoing reflective surface may be subjected to treatment such as polishing and anodization to adjust the light reflectance thereof.

The color of the foregoing reflective surface is related to reflected light but practically may be white, gray, blue, green, yellow, silver, gold, brown or the like. In order to efficiently allure fleas, the color of the foregoing reflective surface is preferably blue or green as described with reference to light from the light source. White light composed of emission spectrum of basic pure colors such as green and blue and emission spectrum of fluorescent color having a wavelength up to 600 nm such as yellow in combination is also desirable.

When the reflective surface irregularly reflects light, its irregular reflectance is preferably from 50 to 100%, more preferably from 80 to 100%.

In order to cause irregular reflection, the foregoing reflector may have glass, metal such as aluminum and silver or light-diffusing material such as resin and air bubble formed on a substrate in the form of powder, splinter or bead. The foregoing light-diffusing material may be provided on the substrate in a dot or striped pattern. Alternatively, the surface of the foregoing reflector may have small holes or protrusions formed thereon or may be formed stepwise to have an unevenness that causes irregular reflection. Further, the reflector may be coated with a sheet formed by laminating surface-roughened glass or resin sheets having different reflectances to cause irregular reflection.

In the present invention, a plurality of reflective surfaces having the foregoing properties may be used.

As the light source for emitting light effective for attracting fleas in the means (2) of the present invention there may be used any light source such as incandescent electric lamp, miniature bulb, fluorescent tube and light emitting diode so far as it is effective for attracting fleas. However, light emitting diodes are preferably used because they consume little electric power, have a prolonged life and can emit light at a wavelength effective for attracting fleas.

In particular, the aforementioned high brightness-light emitting diode which emits light having a predetermined luminous intensity and a predetermined wavelength is preferably selected and used. In other words, the foregoing means (1) and (2) are preferably used in combination.

The combined use of the foregoing means (1) and (2) provides an excellent effect for attracting fleas growing and living in the living environment of human being, particularly those coming from dog and cat. Those fleas thus attracted can be caught by the catching means at a remarkably high efficiency.

In the present invention, lens or the like can be used to allow light from the light source to reach farther.

The foregoing reflective surface preferably slopes forward the side that light from the light source is arrived so that the flea catching zone is irradiated with light reflected by the reflective surface together with light from the light source in such a manner that even points apart from the end of the catching means at the maximum moving distance made by one leap of a flea have an illuminance effective for attracting fleas.

This arrangement provides a further synergistic effect with light source, making it possible to accelerate the attracting activity and certainly catch fleas which have been attracted within the surroundings of the apparatus even if the apparatus is compact.

When the slant reflective surface is irradiated with light, light is then reflected by the reflective surface onto the surrounding floor (flea catching zone) so that the reflective surface, too, is perceived as a light source by fleas which then fly at the reflective surface.

Referring to the reflective surface, the angle X of inclination of the reflective surface with respect to the installation surface (horizontal plane) ranges from the minimum value at which light from the light source can hit the floor as lower limit to less than 90° as upper limit. In some detail, it is preferably from 5 to 60°, more preferably from 10 to 25°.

In the present invention, the reflective surface is preferably disposed below the light source and on the installation surface along the direction of irradiation with light from the light source. In this arrangement, the apparatus can be conveniently designed, making it possible to provide a compact apparatus.

In the means (2) of the present invention, the height of the light source and the positioning of the light source with respect to the reflective surface are very important to allow the reflective surface to be properly irradiated with light from the light source. It is preferred that light reflected by the reflective surface be entirely aimed at the floor in the light of flea attracting activity.

The height of the light source L is preferably low. This is because the greater the height of the light source L is, the more strictly is limited the directivity of the light source. This is also because the farther the light source is apart from the reflective surface, the lower is the illuminance (lux) on the reflective surface and the reflective surface is more difficultly irradiated with light.

Figure 2:
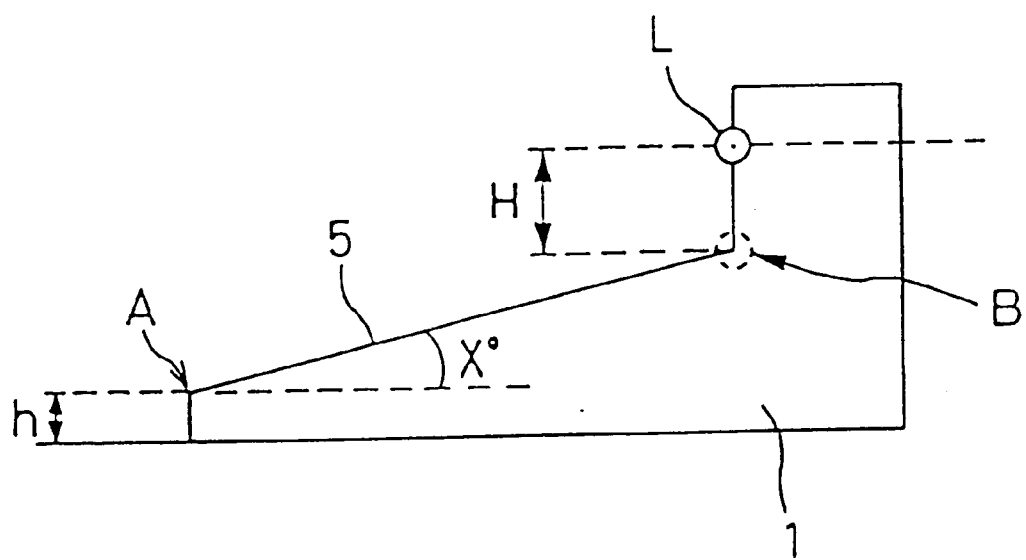
FIG. 2 is a schematic side view of the flea catching apparatus of FIG. 1.

Accordingly, the light source L is preferably disposed 0 to 10 cm, more preferably 2 to 5 cm, above on the basis of the point B on the reflective surface (which also acts as an adhesive sheet as a catching means in the apparatus shown in FIG. 2) closest to the light source.

On the other hand, the point A on the reflective surface farthest from the light source is on the lower end of the reflective surface and the forefront of the apparatus. The point A needs to be designed taking into account the fact that the construction of the apparatus is subject to some restrictions. For example, (1) the lower the height of the point A is, the more easily the apparatus can be reached by fleas. (2) The lower the height of the point A is, the more easily the reflective surface can be irradiated with light from the light source. Thus, the height of the point A is preferably lower. (3) On the contrary, the forefront of the apparatus needs to be somewhat thick taking into account the strength of the member constituting the forefront of the apparatus. (4) The stopping portion needs to be high enough to stop and support the lower end of the adhesive sheet. (5) The forefront of the apparatus needs to be high enough to prevent fleas which have entered the apparatus from escaping therefrom. Thus, the point A needs to be somewhat high (h) taking into account the restrictions (3) to (5). Therefore, the height of the point A needs to be determined taking into account these restrictions as a whole.

Accordingly, the height of the point A is preferably from 0.5 to 5 cm, more preferably from 1 to 2 cm from the floor on which the apparatus is installed.

In the present invention, the area of the reflective surface is preferably from 30 to 500 $cm^2$, more preferably from 60 to 100 $cm^2$.

The constitution of the present invention except the foregoing means (1) and (2) will be described hereinafter.

In the present invention, as the means of catching fleas which have been attracted to light emitted by the foregoing light source there may be used any means which can catch or kill fleas which have been thus attracted. Examples of such a means include an adhesive sheet which can use its adhesive force to catch fleas which have been attracted, a sheet which uses electrostatic force to catch fleas which have been attracted, an electric insect killing device which can electrically kill fleas which have been attracted, an insecticide-coated sheet, and a vessel containing water. Preferred among these means is adhesive sheet.

As the adhesive sheet which can use its adhesive force to catch fleas there may be used any conventional adhesive sheet.

This adhesive sheet can be mounted on the apparatus at a sheet mounting portion by upwardly or downwardly bonding, clamping, screwing or fitting it. The adhesive sheet can be in the form of laminate of a plurality of double-sided adhesive sheets so that it can be used many times by peeling each sheet. Alternatively, the adhesive sheet may be arranged such that it can be washed on one or both surfaces thereof for repeated use. Further, the adhesive sheet may be arranged such that it can be used on both surfaces thereof.

It is preferred that a covering member such as lattice be provided on the adhesive sheet so that the adhesive sheet cannot be touched by children's fingers or pets' foot or the adhesive surface can be prevented from being blocked by dust or insect. The covering member such as lattice is preferably transparent enough not to block the reflection of light by the adhesive surface (if it also acts as a reflective surface) or may be made of a material the surface of which reflects light well. The covering member such as lattice is preferably arranged to be removably mounted on the apparatus slightly apart from the adhesive sheet. The covering member such as lattice may be arranged to be removed and cleaned whenever stained. Further, the covering member such as lattice and the members constituting the apparatus of the present invention may have been treated with a water repellent, an oil repellent, an antistatic agent or the like so that it can hardly be stained.

The adhesive sheet may act as the foregoing reflective surface itself. Alternatively, the adhesive sheet may be provided separately from the reflective surface.

The adhesive sheet may previously have an adhesive provided on the upper surface thereof or may have a coated layer formed on the upper surface thereof before use. When the adhesive sheet is provided separately from the reflective surface, the surface of the coated layer may be normally smooth or rough. The shape of the adhesive surface is not specifically limited but is arbitrary so far as it can catch fleas. Further, as the adhesive employable herein there may be used any adhesive so far as it can effectively catch fleas. The adhesive surface may be prepared by spraying an adhesive. Examples of the adhesive sheet having a rough surface include a three-dimensionally network adhesive sheet and a three-dimensionally lattice-shaped adhesive sheet. Such an adhesive sheet can be prepared by adding an adhesive to the entire surface of a network or three-dimensionally lattice-shaped sponge which has been formed at a high percent foaming, a network or three-dimensionally lattice-shaped wire-worked product or a honeycomb material (raw paper, corrugated board, resin, foam, metal, rubber, sponge, etc.) by dipping, spray or the like to render the surface of the material adhesive. With this arrangement, the adhesive sheet can exhibit good light transmission properties and a wider adhesive area.

The size of the adhesive sheet depends on the size of the chamber in which the apparatus of the present invention is used, or the percent catching of flea, and is preferably 5 cm to 10 cm×7 cm to 15 cm.

In the present invention, the adhesive sheet which is used as a catching means preferably acts as the foregoing reflective surface. In this arrangement, both light from the light source and reflected part thereof can be used to catch fleas at a high efficiency regardless of the area of the adhesive sheet. Thus, the area of the adhesive sheet can be reduced, making it possible to provide a compact flea catching apparatus which can be easily carried outdoors and can occupy a reduced space.

As the adhesive sheet which acts both as reflective surface and adhesive surface there may be used a reflector having a high reflectance coated with an adhesive having a high light transmittance and a low light absorbance.

When the foregoing reflective surface is provided separately from the adhesive surface of the adhesive sheet, the following structures can be used. For example, an adhesive sheet made of a light-transmitting material and a reflector may be laminated in such an arrangement that the latter is disposed on the lower side. Alternatively, a covering member having many holes or slits (lattice, striped, network, etc.) the surface of which acts as a reflective surface may be disposed on an adhesive sheet in such an arrangement that it doesn't impede the catching of fleas. Further, part of the apparatus (main body of the apparatus, the other side of a canopy provided above the light source, etc.) may act as a reflective surface separately from the adhesive sheet. These structures may be combined. In the present invention, a plurality of reflective surfaces may be disposed in the apparatus.

In the present invention, the process and apparatus of the present invention may employ other attracting means or insect killing means as well. For example, a heating means such as heater, a carbon dioxide gas generator or a means containing an attracting agent such as butyric acid and lactic acid may be used. The means containing an attracting agent such as butyric acid and lactic acid may be disposed at any positions in the apparatus of the present invention. In particular, the foregoing attracting agent may be disposed on, added to, kneaded in, applied to, impregnated in, sprayed onto, bonded to or printed on the adhesive and/or substrate of the adhesive sheet.

As necessary, a means may be used containing an insect growth controller (IGR) such as allethrin, resmethrin, permethrin, cypermethrin, cyhalothrin, cyfluthrin, fenpropathrin, tralomethrin, cycloprothrin, fenvalerate, esfenvalerate, ethofenprocks, enpenthrin, pralethrin, transfurthrin, phenothrin, cyphenothrin, pyrethroyd-based compound containing isomers, derivatives or analogies thereof, diflubenzuron, teflubenzuron, chloroflubenzuron, buprophedine, phenoxycarb, methoprene, hydroprene and pyriproxyphene or an insecticide such as organic phosphorus compound (e.g., pirimiphos-methyl, diazinone, pyridaphenthion, fenitrothion, chloropyrifos-methyl, chloropyrifos, dichlorbos, malathion, dimethoate, dimethylvinphos, salithion, trichlorophone, ethion) and carbamate-based compound (e.g., carbaryl, metrocarb, isoprocarb, phenobcarb, propoxur, xylylcarb, ethifencarb, benidyeocarb, pirimicarb, carbosulfan, methomul, oxamyl). In some detail, the foregoing insecticides may be directly or indirectly kneaded in, applied to, impregnated in, sprayed onto, bonded to, printed on and added to part of the catching apparatus of the present invention or the adhesive and/or substrate of the adhesive sheet as it is or in diluted form.

The target animals to be caught according to the present invention are fleas living indoors and outdoors. The process and apparatus of the present invention are particularly suitable for the extermination of fleas separated from house pets such as cat and dog. Specific examples of such fleas include dog flea, cat flea, human flea, Cheops rat flea, rat fat flea, blind rat flea, Japanese rat flea, European rat flea, and rat sand flea. The maximum moving distance made by one leap of such a kind of flea, when the flea is an adult, is from about 30 cm to 40 cm in the horizontal direction.

An example of the apparatus suitable for the present invention is shown in FIG. 1. The main body 2 of a flea catching apparatus 1 comprises a light source retaining portion 3 and an adhesive sheet retaining portion (catching portion) 4. Mounted on the light source retaining portion 3 are light sources (light emitting diodes) 8, 9. Disposed on the installation surface (floor or flea catching zone) irradiated with light from the light sources 8, 9 is an adhesive sheet 5 which is retained by the adhesive sheet retaining portion 4 on the upper part thereof. The adhesive sheet 5 is inclined in such an arrangement that it goes almost along the emitting direction of light from the light sources 8, 9 (angle of inclination X°).

Retained by the adhesive sheet retaining portion 4 is an adhesive sheet 5 having a size of 9×8 cm. Mounted on the apparatus above the adhesive sheet 5 is a lattice 6. The lattice 6 is preferably arranged to have 9 longitudinal frames and 1 crosswise frame and fit in the frame by which the adhesive sheet 5 is retained. The lattice 6 may pivot on the line along which the face 7 and the lattice 6 cross each other. In this case, as shown in FIG. 1, the lattice 6 may have an opening so that the light source 8 is not brought into contact with the lattice 6 when it pivots upward.

In FIG. 1, the adhesive sheet 5 acts also as the reflective surface as defined herein.

The light source retaining portion 3 is a rectangular parallelopiped. Two light sources 8, 9 are mounted on the face 7 (face of the catching device) of the light source retaining portion 3 which faces the adhesive sheet 5 and stands almost upright to the floor at the height of 6 cm from the floor. The light source 8 is a high brightness-light emitting diode which emits green light, and the light source 9 is a high brightness-light emitting diode which emits white light. Contained inside the light source retaining portion 3 are a substrate for light emitting diode and two alkaline dry batteries (size: R14).

The size of the main body 2 of the flea catching apparatus 1 was as small as 115 mm wide×135 mm long×65 mm high.

Figure 5:
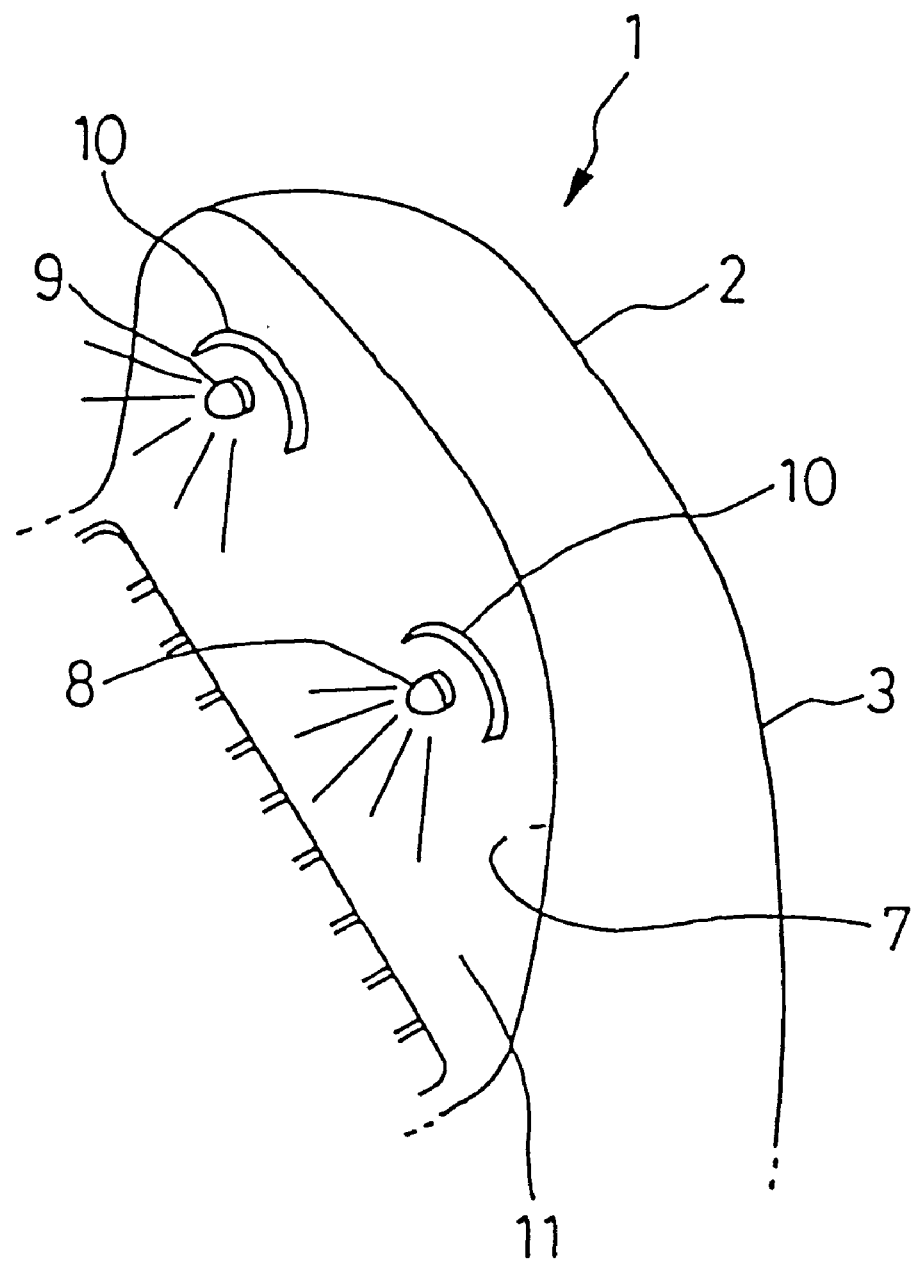
FIG. 5 is a perspective view of an Example of the surface of the foregoing embodiment of the flea catching apparatus according to the present invention on which light emitting diodes are mounted.
Figure 6:
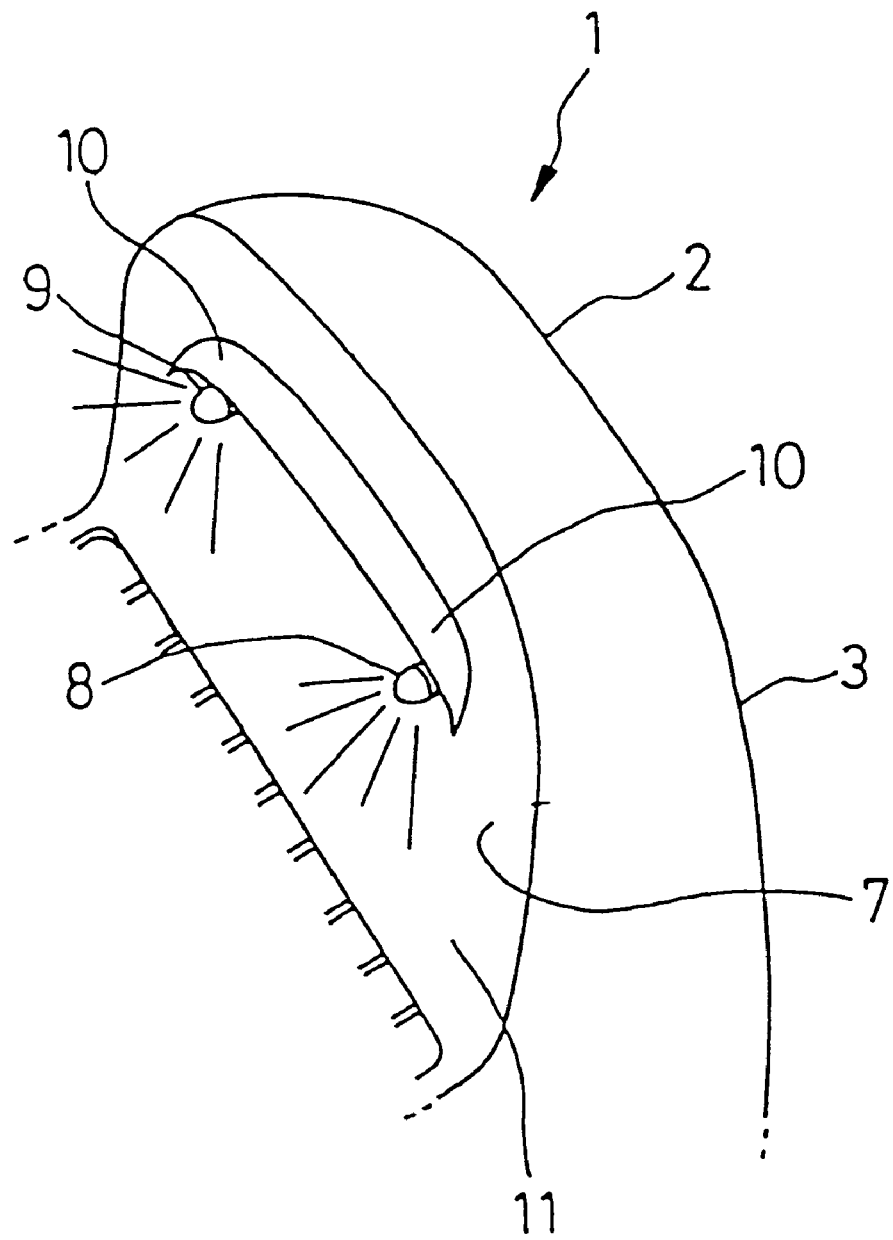
FIG. 6 is a perspective view of another Example of the surface of the foregoing embodiment of the flea catching apparatus according to the present invention on which light emitting diodes are mounted.

As shown in FIGS. 5 or 6, which illustrates only part of the flea catching apparatus 1, a canopy 10 may be provided on the face 7 above the position at which the light sources 8, 9 are mounted so that light from these light sources can be prevented from being leaked upward to minimize the optical stimulation on human beings.

Figure 8:
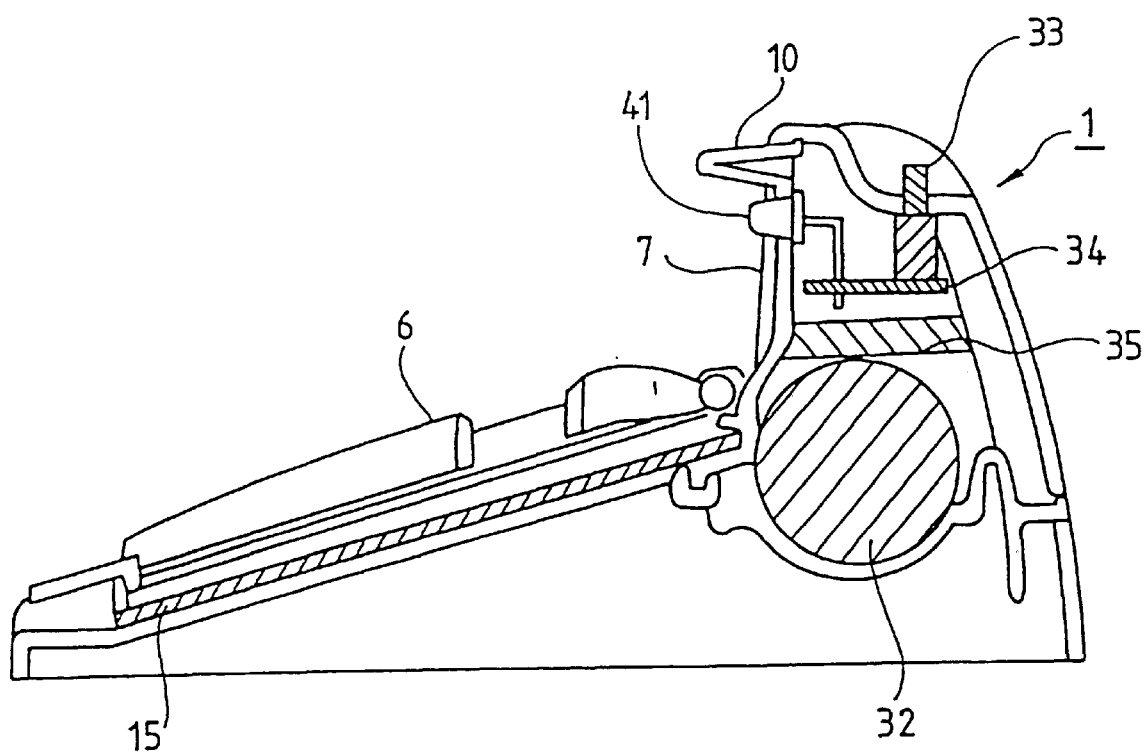
FIG. 8 is a detailed schematic sectional view of the flea catching apparatus of FIG. 1.

FIG. 8 is a detailed schematic diagram illustrating the apparatus shown in FIG. 1 having a canopy 10 as shown in FIG. 6 provided thereon. The apparatus 1 shown in FIG. 8 comprises a light source 41, a canopy 10, a lattice 6, a face 7 and an adhesive sheet 15 as in FIGS. 1 and 6. The lattice 6 is arranged to pivot on the line along which the face 7 and the lattice 6 cross each other so that the adhesive sheet 5 can be easily renewed. As mentioned above, the lattice 6 has an opening. Provided inside the main body of the apparatus 1 are a dry battery 32, a cushioning material 35 disposed on the dry battery 32, and an electronic parts board 34 disposed on the cushioning material 35 and connected to a switch 33 and a light source 41.

Figure 7:
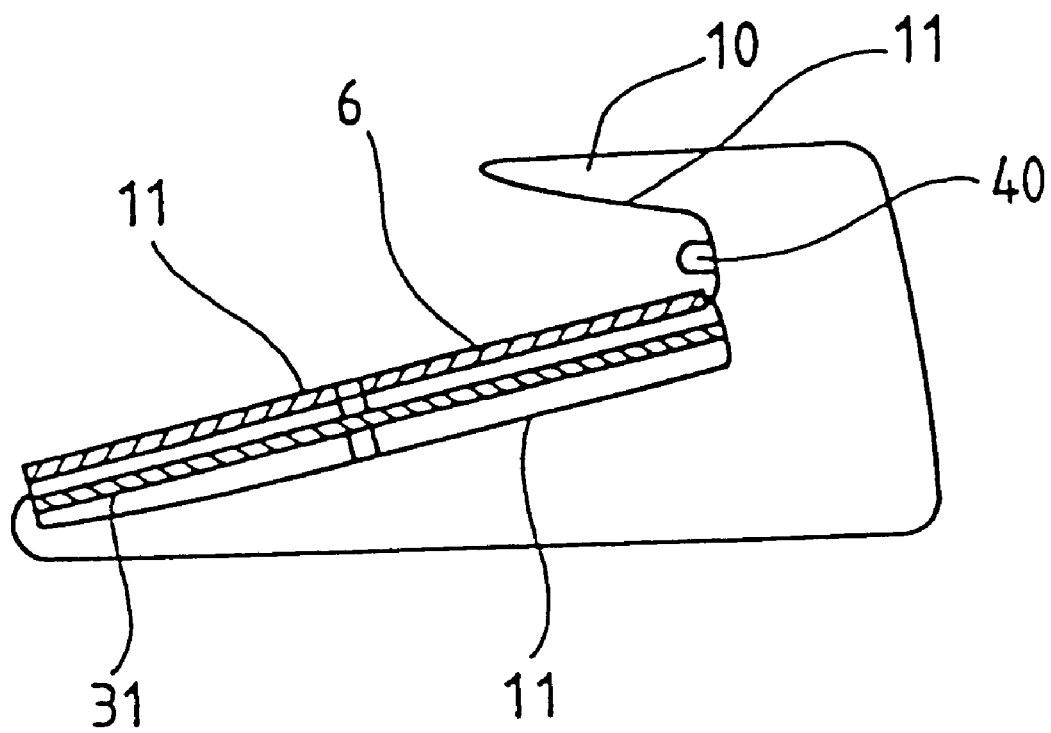
FIG. 7 is a schematic side view of another embodiment of the flea catching apparatus according to the present invention.

In this structure, the canopy 10, the lattice 6 and the face 7 each may be a reflective surface 11 themselves. As an example of the structure in which the lattice 6 and the canopy 10 act as a reflective surface there may be proposed another embodiment of the flea catching apparatus shown in FIG. 7. FIG. 7 is a schematic side view illustrating the apparatus. The apparatus shown in FIG. 7 comprises three reflective surfaces 11. In other words, the canopy 10 protrudes more so that the lower surface (surface closer to the light source than the other) of the canopy 10 acts as a first reflective surface 11. Further, the upper surface of the lattice 6 acts as a second reflective surface 11. In the main body of the apparatus, the surface which faces the adhesive sheet 31 acts as a third reflective surface 11, and a transparent adhesive sheet 31 is used as the adhesive sheet. In this arrangement, the transparent adhesive sheet 31 can transmit light from the light source to cause light to be reflected by the third reflective surface 11.

In order to catch fleas at a higher efficiency, the flea catching apparatus can be further improved. For example, the flea catching apparatus is preferably arranged such that fleas can see light from the light source and reflected light from any angle and can be attracted from any angle. As such an apparatus there may be proposed a round flea catching apparatus (plane view of this apparatus is shown in FIG. 4) as shown in FIG. 3.

Figure 3:
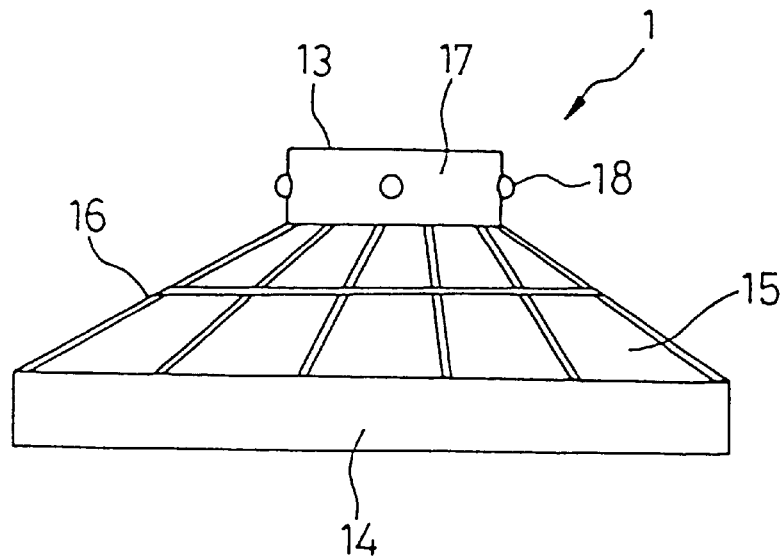
FIG. 3 is a front view of a round flea catching apparatus as another embodiment of the present invention.
Figure 4:
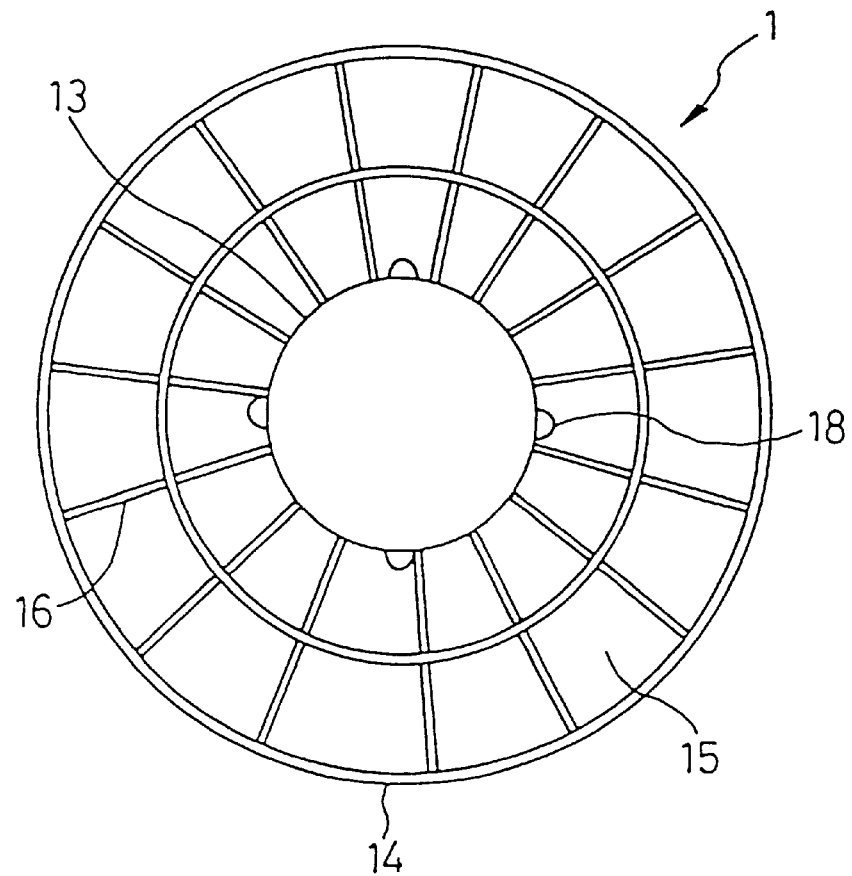
FIG. 4 is a plan view of the flea catching apparatus of FIG. 3.

The flea catching apparatus 1 of FIG. 3 comprises a main body 2 composed of a round umbrella adhesive sheet retaining portion 14 and a cylindrical light source retaining portion 13.

An adhesive sheet 15 is retained by the inclined upper surface of the adhesive sheet retaining portion 14. Mounted on the flea catching apparatus above the adhesive sheet 15 is a lattice 16 having a radial skeleton. The adhesive sheet 15 acts also as a reflective surface as defined herein.

Mounted at regular intervals on the peripheral side surface 17 of the cylindrical light source retaining portion 13 are four light sources 18.

A further embodiment of the apparatus of the present invention comprises light sources provided in an approximately central portion of the interior of a main apparatus body the vertical section of which is almost rectangular (lower surface has a larger area than upper surface). Provided on the main body of the apparatus above the light source is a lattice brought into contact with the exterior of the apparatus. Provided on the side surface of the main body of the apparatus is a lens. Provided around the light source (below the lattice) inside the main body of the apparatus is an adhesive sheet capable of catching fleas. The irradition direction of light from the light source is almost parallel to at least the installation surface. The foregoing lens is in the path of irradiation of light from the light source. The flea catching zone is irradiated with light from the light source in such a manner that at least one point apart from the end of the catching means at the maximum moving distance made by one leap of a flea has an illuminance effective for attracting fleas. Further, the use of a lens makes it for light from the light source to reach farther. A flea which has been attracted to light from the light source enters into the interior of the apparatus through the lattice disposed on the upper part of the main body of the apparatus where it is then caught by the adhesive sheet disposed below the lattice.

Alternatively, light sources may be provided also at points other than above the adhesive sheet as shown in FIG. 1 or 3. Explaining with reference to FIG. 2, which is a schematic side view of the flea catching apparatus, a second light source may be provided inside the apparatus in the vicinity of the lower end A of the adhesive sheet (end of the catching means) besides the light source L. A lens may be provided on the side surface of the main body of the apparatus brought into contact with the lower end A of the adhesive sheet so that light from the second light source can hit the flea catching zone through the lens. The use of the lens makes it for light from the light source to reach farther. In FIG. 2, besides the light source L, to the lower surface of the main body of the apparatus below the lower end A (end of the catching means) may be attached a flexible lever or chord having a second light source provided at the end thereof opposite the apparatus. Running through the lever or chord is an electrical wire connected to the light source. In operation, the second light source is preferably disposed at at least one of positions separated from the end A of the catching means by the maximum moving distance made by one leap of a flea.

In the present invention, the main body of the flea catching apparatus may have a color tone which absorbs light at a wavelength of from 400 nm to 600 nm.

DESCRIPTION OF REFERENCE NUMERALS

1 Flea catching apparatus
2 Main body
3 Light source retaining portion
4 Adhesive sheet retaining portion
5 Adhesive sheet (reflective surface)
6 Lattice
7 Face
8 Light source
9 Light source
10 Canopy
11 Reflective surface
13 Light source retaining portion
14 Adhesive sheet retaining portion
15 Adhesive sheet (reflective surface)
16 Lattice
17 Side surface
18 Light source
A Lower end of adhesive sheet
B Upper end of adhesive sheet
L Light source
20 Test chamber
21 Looped carpet
22 Flea release position
23 Flea catching apparatus of the present invention
24 Comparative sample
25 Control
26 Adhesive sheet
27 Self-recording thermometer/hygrometer
31 Transparent adhesive sheet
32 Dry battery
33 Switch
34 Electronic parts board
35 Cushioning material
40 Light source
41 Light source
42 High brightness-light emitting diode Best Embodiment of the Present Invention

EXAMPLE 1

Using the following samples a and b of the present invention and the following commercial product A, the relationship between the distance from the end of the adhesive sheet as a catching means and the luminous intensity at the point was examined. Further, the following sample a and commercial products A and B were subjected to flea catching test.

Sample a of the Present Invention

In the apparatus shown in FIG. 1, as light sources there were used two high brightness-light emitting diodes. One of the two high brightness-light emitting diodes emits green light (wavelength: 525 nm) at a luminous intensity of 3.0 [cd], and the other emits white light (wavelength: 470 nm and 560 nm) at a luminous intensity of 0.8 [cd]. The two high brightness-light emitting diodes were allowed to go on and off (duty ratio: 50%; frequency: 1 Hz). The angle (X°) of inclination of the adhesive sheet was 15°. The adhesive sheet was a silver mirror sheet the total reflectance of which was 85%.

Sample b of the Present Invention

The sample b was the same as the sample a except that it comprises only one high brightness-light emitting diode which emits green light (wavelength: 525 nm) at a luminous intensity of 3.0 [cd].

Commercial Product A

As a light source there was used one incandescent lamp. An adhesive sheet was disposed in the path of irradiation of light from the light source. The adhesive sheet was substantially parallel to the installation surface. Provided on the side of the light source opposite the irradiation side was a reflector. Provided in front of the light source was an irradiation plate (light diffusion plate) having almost the same width as that of the adhesive sheet.

The foregoing samples a and b and commercial product A were then measured for the distance (m) from the lower end (lower end A in FIG. 2) of the adhesive sheet as a catching means and the luminous intensity [lux] at the point. The foregoing distance is a distance from the light source in the direction of emission. In the case of the sample a of the present invention, the foregoing distance is a distance from the middle point between the two light sources in the direction of irradiation.

Figure 9:
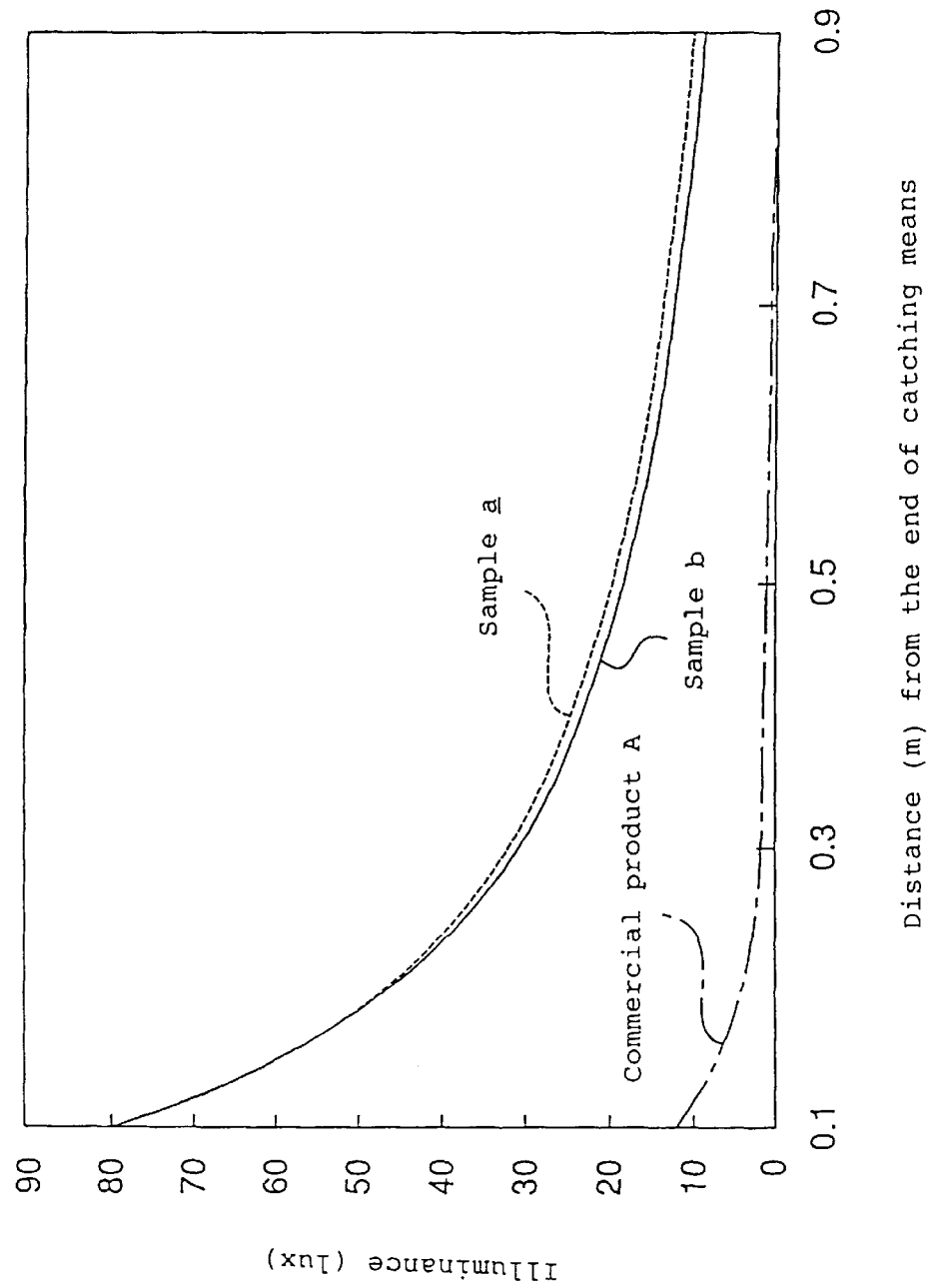
FIG. 9 is a graph illustrating the relationship between the distance from the end of the adhesive sheet and the luminous intensity at the point.

The results of measurement in a luminous intensity of these samples are shown in FIG. 9. In the samples a and b of the present invention, the luminous intensity even at a distance as far as 50 cm from the end (lower end A in FIG. 2) of the adhesive sheet was greater than 15 [lux]. On the contrary, in the commercial product A, the luminous intensity even at a distance as close as 20 cm from the end (lower end A in FIG. 2) of the adhesive sheet was about 5 [lux].

Subsequently, the foregoing samples a and commercial product A and the following commercial product B were subjected to flea catching test.

Commercial Product B

This is an apparatus comprising a tray disposed parallel to the installation surface having an adhesive sheet provided on the bottom thereof, a cover fixed on the upper part of the tray by a wire support and a miniature electric bulb screwed into the inner side of the cover as a light source. The direction of irradiation of light from the light source is 90° downward from the horizontal direction.

Testing Method

The foregoing sample a and the foregoing commercial product A or B were installed 360 cm apart from each other in a case in such an arrangement that the light source of the two samples were opposed to each other. The interior of the case was kept dark. Under these conditions, the light source of the two apparatus were then allowed to emit light. 55 cat fleas were released at the middle point between the foregoing sample a and the commercial product A or B. The time elapsed from the time at which these fleas were released, the moving distance of these fleas (moving distance from the point at which these fleas were released) and the number of fleas caught in these apparatus were observed. The results of flea catching test on the foregoing sample a and commercial product A are shown in Table 1, and the results of flea catching test on the foregoing sample a and commercial product B are shown in Table 2.

fleas, they can be caught at a remarkably high efficiency. It is also made obvious that the present invention exerts an immediate effect of catching fleas.

EXAMPLE 2

(Testing Method)

Figure 10:
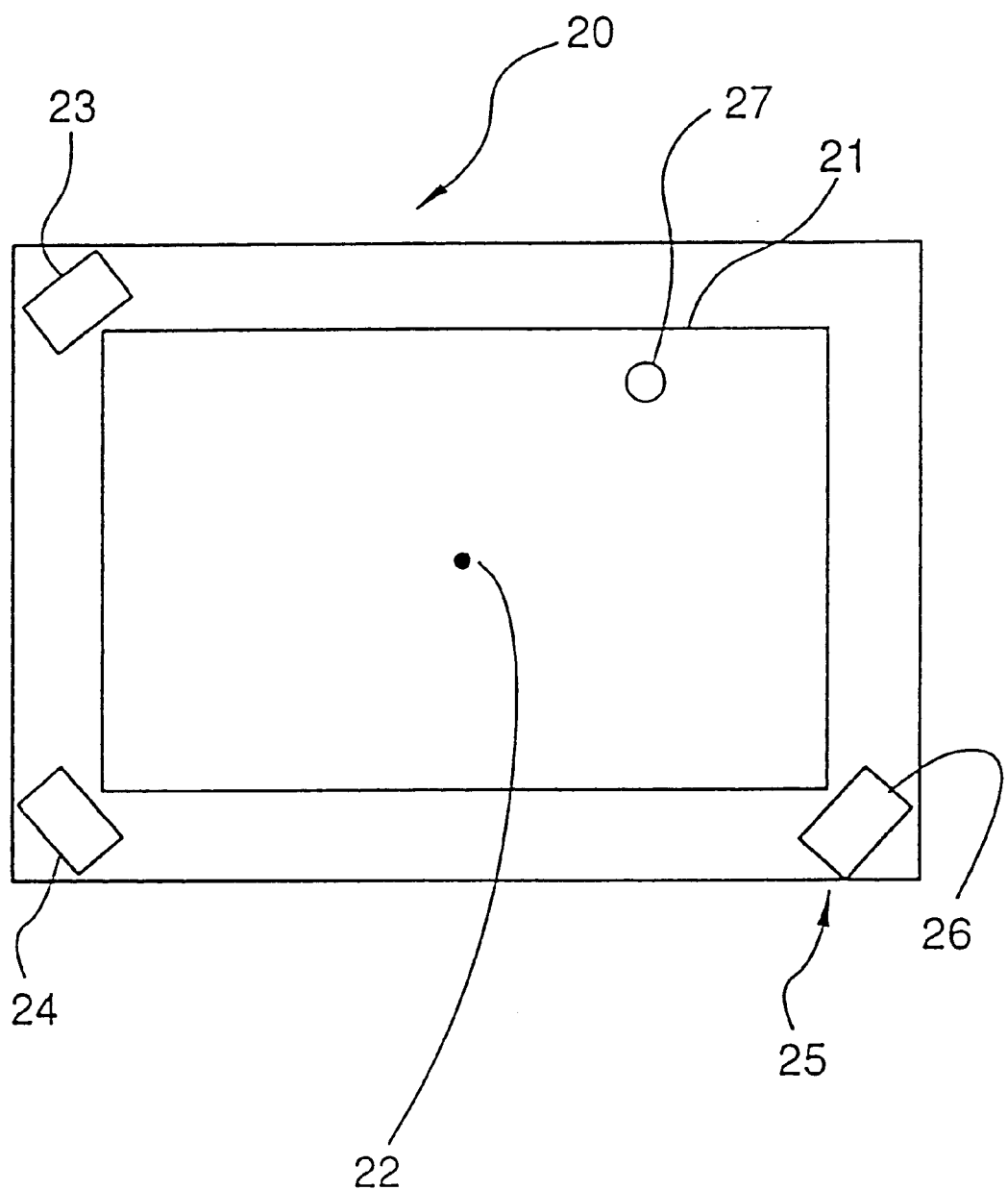
FIG 10 is a top view of the interior of a test chamber 20 for testing the catching percent of flea.

A top view of the interior of the test chamber 20 is shown in FIG. 10.

Figure 11:
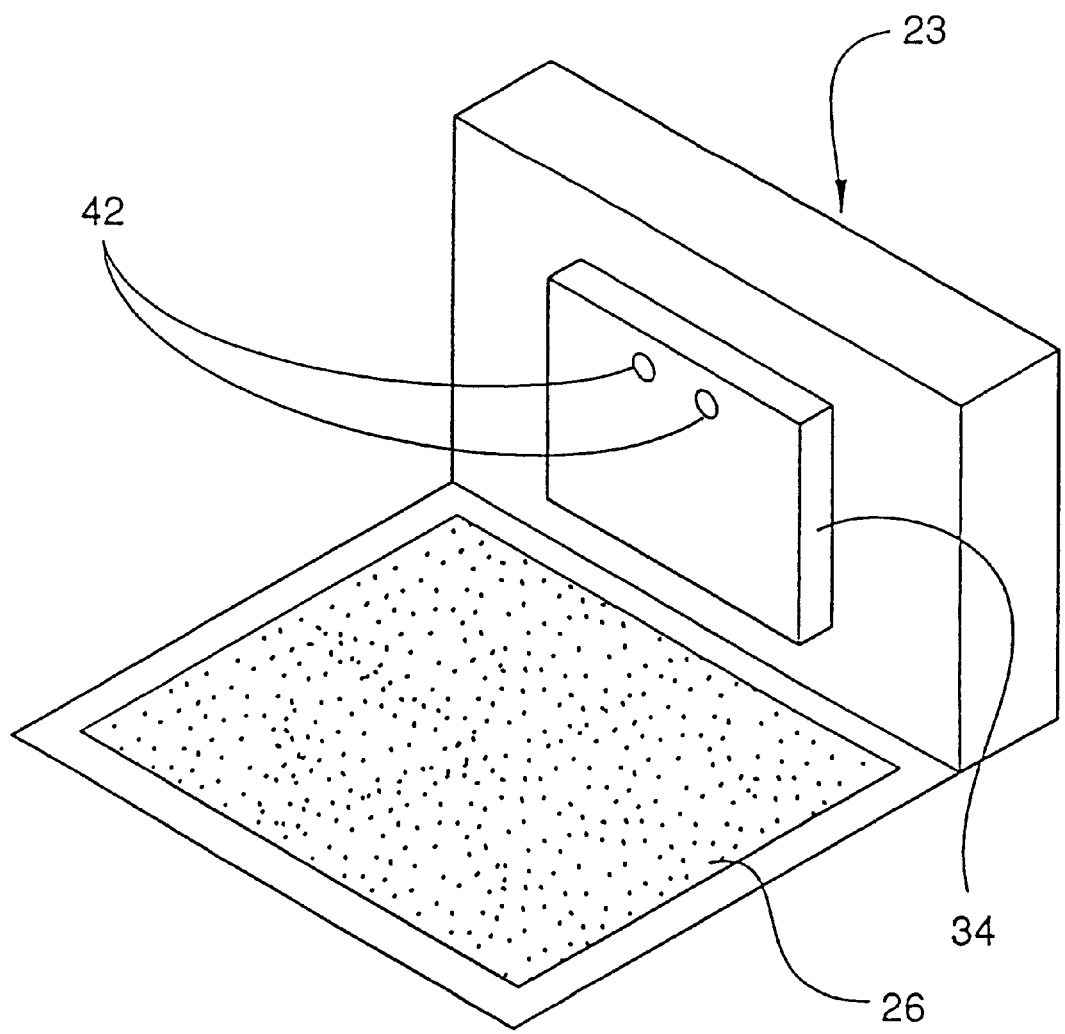
FIG 11 is a perspective view of another embodiment of the flea catching apparatus according to the present invention.

On the supposition that it is an actual scene, a looped carpet 21 (2.5 m×4.3 m) was laid on the floor of an open space test chamber 20 (3.5 m×4.5 m×2.5 m) installed outdoors. A flea catching apparatus 23 of the present invention was installed on the corners of the test chamber 20. A schematic perspective view of the apparatus 23 of the present invention is shown in FIG. 11. The apparatus 23 of the present invention is provided with an adhesive sheet 26 and a high brightness-light emitting diode 42. The reason why the looped carpet is used is that fleas which have been released and got in the carpet can be easily fixed there but can hardly move therefrom.

When the apparatus 23 of the present invention was compared with a comparative sample 24 such as commercial products and comparative examples, the comparative

TABLE 1

| Sample | Elapsed time (hr) | Moving distance (cm) and number of cat fleas | | | | Number of fleas caught by adhesive sheet |
|---|---|---|---|---|---|---|
| | | 0–60 | 60–100 | 100–140 | 140–180 | |
| Sample a | 1 | 8 | 2 | 7 | 16 | 16 |
| | 2 | 4 | 2 | 6 | 11 | 26 |
| | 3 | 1 | 1 | 2 | 4 | 41 |
| Commercial product A | 1 | 0 | 0 | 0 | 1 | 1 |
| | 2 | 0 | 0 | 0 | 0 | 2 |
| | 3 | 0 | 0 | 0 | 0 | 2 |

TABLE 2

| Sample | Elapsed time (hr) | Moving distance (cm) and number of cat fleas | | | | Number of fleas caught by adhesive sheet |
|---|---|---|---|---|---|---|
| | | 0–60 | 60–100 | 100–140 | 140–180 | |
| Sample a | 1 | 0 | 0 | 3 | 13 | 41 |
| | 2 | 0 | 0 | 2 | 2 | 53 |
| | 3 | 0 | 0 | 0 | 4 | 53 |
| Commercial product B | 1 | 1 | 0 | 0 | 0 | 1 |
| | 2 | 0 | 0 | 1 | 0 | 1 |
| | 3 | 0 | 0 | 0 | 1 | 1 |

Tables 1 and 2 show that the commercial products A and B can attract and catch little or no fleas. On the contrary, the sample a of the present invention can catch not less than 80% of the fleas released in 3 hours from the release on the adhesive sheet. It can be also seen in these tables that a considerably large number of fleas can be attracted on the installation surface within 40 cm (corresponding to the maximum moving distance made by one leap of a cat flea) from the sample a in 1 hour from the release. Thus, it is made obvious that the present invention exerts an immediate effect of attracting fleas.

Accordingly, it is made obvious that when the flea catching zone is irradiated with light from the light source in such a manner that at least one point apart from the end of the catching means at the maximum moving distance made by one leap of a flea has an illuminance effective for attracting sample 24 was installed at the corner of opposite faces. As the comparative sample 24 there was used a commercial flea killing apparatus (provided with an adhesive sheet 26 and a 100 V plug-in type electric bulb) or a comparative flea killing apparatus (provided with an adhesive sheet 26 and a light source having properties set forth in Tables 3 and 4).

As a control 25 there was used only the adhesive sheet 26, which was always installed at the corner diagonal to the installation position of the apparatus 23 of the present invention.

The adhesive sheet was adhesive on one side thereof and had a size of 30 cm×29 cm.

100 cat fleas or dog fleas (50 male fleas and 50 female fleas) were released at the central part (flea release position 22) of the carpet. The number of fleas which had been caught by the various adhesive sheets after 14 hours from the release was counted. In order to measure the temperature and humidity in the test chamber 20, a self-recording thermometer/hygrometer 27 was installed on the looped carpet. The distribution of fleas present on the carpet, too, was observed to see how they move from the central part of the carpet. Thereafter, these fleas were allowed to stand in the test chamber 20 for about 4 days during the similar examination was conducted.

The number of fleas caught by the various apparatus was then subjected to calculation by the following equation to determine the catching percent:

Catching (%)=[(Number of fleas caught)/(Number of fleas tested−Number of dead fleas)]×100

(Results)

The catching percent with elapsed days is shown in Table 3 (cat flea) and Table 4 (dog flea) below. Tables 3 and 4 also show the properties of the light sources used. Referring to Test Nos. 4 to 9, the illuminance on the installation surface (floor) at a distance of 30 cm from the end of the adhesive sheet as a catching means was measured. The measurements were shown in Table 4.

The temperature in the test chamber was from 10° C. to 18° C. The flea catching apparatus other than the control and commercial products were each equipped with two light emitting diodes (see FIG. 11). The commercial products were each equipped with one electric bulb.

For the determination of the maximum emission intensity of the various light emitting diodes, these light emitting diodes were measured for emission spectrum 50 cm apart from the measuring instrument (spectrophotometer). The measurements were then numerically plotted as relative emission intensity on Y axis versus the wavelength distribution on X axis. The maximum emission intensity values shown in Tables 3 and 4 are the relative emission intensity values of the various light emitting diodes.

The luminous intensity of the various light emitting diodes were estimated and calculated from the emission spectrum measured on the basis of the values of luminous intensity of known light emitting diode (pure blue and pure green). The high luminance light emitting diode used in the apparatus of the present invention emits a monochromatic light having an emission spectrum pattern which is almost normally distributed with the main wavelength as a center.

The results shown in Tables 3 and 4 show that when the adhesive sheet alone is used, little or no fleas can be caught

TABLE 3

Results of catching percent of cat fleas

| Test No. | Type of apparatus tested | Properties of light source | | | | | | Catching % with elapsed days | | | |
|---|---|---|---|---|---|---|---|---|---|---|---|
| | | Color | Luminous Intensity (cd) | Maximum emission intensity | Main wave-length (nm) | Half-width (nm) | Flashing frequency (Hz) | 1 | 2 | 3 | 4 |
| 1 | Present invention | Blue | 0.74 | 23,500 | 450 | 30 | 24.5 | 10 | 33 | 56 | 68 |
| 2 | Present invention | Green | 12 | 30,000 | 525 | 40 | 25.8 | 13 | 46 | 65 | 75 |
| 3* | Adhesive sheet alone | — | — | — | — | — | — | 1.5 | 1.5 | 2.5 | 3.0 |

*The value of catching percent averaged over that of the apparatus of Test Nos. 1 and 2 which were installed at the same time without light emission is given.

TABLE 4

Results of percent catching of dog fleas

| Test No. | Type of apparatus tested | Properties of light source | | | | | | Catching % with elapsed days | | | | | Illumiance (lux*3) |
|---|---|---|---|---|---|---|---|---|---|---|---|---|---|
| | | Color | Luminous Intensity (cd) | Maximum emission intensity (nm) | Main wave-length | Half-width (nm) | Flashing frequency (Hz) | 1 | 2 | 3 | 4 | 5 | |
| 4 | Present invention | Green | 12 | 30,000 | 525 | 30 | 25.8 | 17 | 50 | 59 | 73 | 76 | 24.4 |
| 5 | Present invention | Green | 5.8 | 14,500 | 525 | 40 | 21.5 | 14 | 36 | 42 | — | — | 11.8 |
| 6 | Present invention | Green | 12 | 30,000 | 525 | 30 | Continous | 14 | 16 | — | 25 | 54 | 24.4 |
| 7 | Present invention | Green | 12 | 30,000 | 525 | 30 | 35.5 | 12 | 13 | 24 | 28 | 57 | 24.4 |
| 8 | Commercial product | Green | <0.3 | 750 | None*1 | — | Continous | 0 | 4 | 6 | 6 | 6 | 1 |
| 9 | Comparative product | Green | <0.3 | 750 | None*1 | — | 20.5 | 0 | 0 | — | — | — | 3 |
| 10*2 | Adhesive sheet alone | — | — | — | — | — | — | 0.7 | 0.7 | 1.7 | 3.7 | 4.0 | — |

*1The term "none" as used herein means that numeral peaks are present in the emission spectrum but no main wavelength is present in the emission spectrum.
*2The value of catching percent averaged over that of the apparatus of Test Nos. 4 to 9 which were installed at the same time without light emission is given.
*3The term "illuminance" as used herein means the illuminance on the floor at a distance of 30 cm from the end of the adhesive sheet as a catching means.

even after the lapse of a few days. The fleas caught in this case were possibly results of accidental leap into the adhesive sheet.

In the commercial product tested in Test No. 8 and the comparative apparatus tested in Test No. 9, little or no fleas could be caught. Their catching percent was almost the same as that of the control.

On the other hand, the process and apparatus of the present invention were confirmed to exhibit a considerably high catching percent in a few days in a wide space assumed to be an actual scene in spite of its low atmospheric temperature that retards the activity of fleas. The apparatus of the present invention tested in Test No. 4 and the apparatus of the present invention tested in Test No. 6 were the same except that the former's light source comes on and off and the other's light source is continuously turned on. The apparatus of the present invention tested in Test No. 4, the light source of which comes on and off, exhibits a high catching percent than the apparatus of the present invention tested in Test No. 6, the light source of which is continuously turned on. This proves that the light source preferably comes on and off in the present invention. Even in the flashing process, the catching percent varies with the flashing frequency. The lower the flashing frequency is (or the slower the flashing is), the greater is the catching percent.

Thus, the apparatus of the present invention was confirmed to exhibit a high catching percent of fleas regardless of which they are parasitic on cat or dog.

EXAMPLE 3

(Preparation of Adhesive Sheet Sample)

A paperboard or cardboard was cut into a predetermined size (8×9 cm). The upper surface of the board was given a color tone shown in Table 5 below, and then coated with an adhesive to prepare an adhesive sheet sample.

(Testing Method)

1. Apparatus Tested

The apparatus used for catching was of the type shown in FIG. 1. The apparatus had two lamps [green and white] as light sources. The angle of inclination of the adhesive sheet retained in the adhesive sheet retaining portion to the floor was from 15° to 60° or 0°. Provided around the adhesive sheet was a side wall portion having a height of 1 cm to accommodate the thickness of the adhesive sheet.

One of the two light sources emitted green light (wavelength: 525 nm) and the other emitted white light (wavelength: 470 nm and 560 nm) at a luminous intensity of 7.8 (cd) and 1.4 (cd), respectively, totalling 9.2 (cd).

2. Test Chamber

The foregoing apparatus to be tested was installed at the center of the test chamber. 50 to 100 adult cat fleas (male:female=1:1) were then released at a point 1.8 apart from the apparatus.

(Results of Test)

The caught number of fleas was measured after 1 hour, 2 hours and 3 hours from the release. The catching percent was then calculated. The results of test are shown in Table 5.

The number of fleas caught by the foregoing apparatus was subjected to calculation by the following equation to determine percent catching:

Catching %=[(Number of fleas caught)/(Number of fleas tested−Number of dead fleas)]×100

The term "number of dead fleas" as used herein means the number of fleas which are dead outside the apparatus.

TABLE 5

| Type of sheet | Angle (°) of inclination of adhesive surface to floor | Catching % by sheet surface | | |
|---|---|---|---|---|
| | | After 1 hour | After 2 hours | After 3 hours |
| Brown | 0 | 29.1 | 32.7 | 47.3 |
| Brown | 15 | 22.0 | 50.0 | 66.0 |
| Silver | 15 | 54.5 | 75.3 | 90.9 |
| Silver | 30 | 34.6 | 53.8 | 73.1 |
| Silver | 60 | 75.0 | 80.0 | 85.0 |

As is apparent from the results in Table 5, the fleas can be more rapidly caught in the case where the adhesive surface is inclined as compared with the case where the adhesive surface is parallel to the floor. After 3 hours, a considerable catching percent can be obtained even if the adhesive surface is parallel to the floor.

The apparatus of the present invention was confirmed to exhibit a high catching percent of fleas regardless of which they are parasitic on cat or dog. The apparatus of the present invention can rapidly catch fleas.

EXAMPLE 4

(Preparation of Adhesive Sheet Sample A)

A cardboard was cut into a predetermined size (8×9 cm). The cardboard thus cut was then coated with an adhesive on the upper surface thereof to prepare an adhesive sheet sample A. The sample A was then measured for total reflectance by means of a goniophotometer. The reflectance was 25%. The color tone of the adhesive sheet sample A was brown.

(Preparation of Adhesive Sheet Sample B)

A paperboard was cut into a predetermined size (8×9 cm). An aluminum film was then evaporated onto the upper surface of the paperboard thus cut. The paperboard was then coated with an adhesive on the aluminum film to prepare an adhesive sheet sample B. The sample B was then measured for total reflectance by means of a goniophotometer. The reflectance was 85% (mainly specularly reflected). The color tone of the adhesive sheet sample B was silver.

(Preparation of Adhesive Sheet Sample C)

A paperboard was cut into a predetermined size (8×9 cm). A foil was then transferred to the upper surface of the paperboard thus cut. The paperboard was then coated with an adhesive on the foil to prepare an adhesive sheet sample C. The sample C was then measured for total reflectance by means of a goniophotometer. The reflectance was 70% (mainly specularly reflected, also diffusedly reflected). The color tone of the adhesive sheet sample C was gold.

(Preparation of Adhesive Sheet Sample D)

A paperboard was cut into a predetermined size (8×9 cm). An aluminum film was then evaporated onto the upper surface of the paperboard thus cut. Aluminum splinters were then attached to the aluminum film. The paperboard was then coated with an adhesive on the upper surface thereof to prepare an adhesive sheet sample D. The sample D was then measured for total reflectance by means of a goniophotometer. The reflectance was 80% (mainly diffusedly reflected). The color tone of the adhesive sheet sample D was silver.

(Preparation of Adhesive Sheet Sample E)

A paperboard was cut into a predetermined size (8×9 cm). An aluminum foil (thickness: 8 to 9 $\mu$m) was then stuck (laminated) on the upper surface of the paperboard thus cut. The paperboard was then coated with an adhesive on the aluminum foil to prepare an adhesive sheet sample E. The sample E was then measured for total reflectance by means of a goniophotometer. The reflectance was 50%. The color tone of the adhesive sheet sample E was light gray.

(Testing Method)

1. Apparatus Tested

The apparatus used for catching was of the type shown in FIG. 1. The apparatus had two lamps [high brightness-light emitting diode (green) and high brightness-light emitting diode (white)] as light sources. The angle of inclination of the adhesive sheet retained in the adhesive sheet retaining portion to the floor was 15°. Provided around the adhesive sheet was a side wall portion having a height of 1 cm to accommodate the thickness of the adhesive sheet. One of the two high brightness-light emitting diodes emitted green light (wavelength: 525 nm) and the other emitted white light (wavelength: 470 nm and 560 nm) at a luminous intensity of 7.8 (cd) and 1.4 (cd), respectively, totalling 9.2 (cd).

2. Test Chamber

The foregoing apparatus to be tested was installed at the center of the test chamber. 50 to 100 adult cat fleas (male:female=1:1) were then released at a point 1.8 apart from the apparatus.

(Results of Test)

The caught number of fleas was measured after 1 hour, 2 hours and 3 hours from the release. The catching percent was then calculated. The results of test are shown in Table 6 below. Table 6 also shows the illuminance on the installation surface (floor) at a distance of 30 cm from the end of the adhesive sheet as a catching means, similar to Example 1.

The number of fleas caught by the foregoing apparatus was then subjected to calculation to determine catching percent in the same manner as in Example 3.

TABLE 6

| Type of sheet | Total reflectance (%) | Catching % by sheet After 1 hour | After 2 hours | After 3 hours | Illuminance* (lux) |
|---|---|---|---|---|---|
| Sample A | 25 | 22.0 | 50.0 | 66.0 | 65 |
| Sample B | 85 | 54.5 | 75.3 | 90.9 | 73 |
| Sample C | 70 | 49.3 | 76.0 | 89.3 | 70 |
| Sample D | 80 | 42.6 | 79.4 | 94.1 | 72 |
| Sample E | 50 | 36.4 | 59.1 | 86.4 | 68 |

*The term "illuminance" as used herein means the illuminance on the floor at a distance of 30 cm from the end of the adhesive sheet as a catching means.

As is apparent from the results in Table 6, Samples B to E comprising a reflective surface coated with an adhesive sheet having a high reflectance can catch fleas more rapidly at a higher efficiency as compared with Sample A comprising a reflective surface coated with an adhesive sheet having a low reflectance.

Thus, the apparatus of the present invention was confirmed to exhibit a high catching percent of fleas regardless of which they are parasitic on cat or dog. The apparatus of the present invention can rapidly catch fleas.

Industrial Applicability

An object of the present invention is to provide a flea catching method and apparatus which can effectively attract and catch fleas living in the life space of human being.

A further object of the present invention is to provide a flea catching method and apparatus which can attract and catch fleas at a high efficiency without harming the living environment of human being.

What is claimed is:

1. An apparatus for catching a flea which comprises a light source capable of emitting light effective for attracting fleas, and a catching portion having an adhesive surface which slopes downward from a side thereof at which said light source is disposed, said catching portion being disposed on a flea catching zone along a direction of irradiation with light from said light source, wherein said light from said light source provides an illuminance of not less than 10 lux that is effective for irradiating said flea catching zone in such a manner that at least one point apart from an end of said catching portion at the maximum moving distance made by one leap of a flea has an illuminance of not less than 10 lux effective for attracting fleas, whereby fleas which have been attracted to light from said light source are caught by said catching portion.

2. The apparatus for catching a flea as in claim 1, wherein said adhesive surface comprises a reflective surface which allows light from said light source to be reflected into the flea catching zone, wherein said reflected light together with light from said light source provides an illuminance that is effective for irradiating said flea catching zone in such a manner that at least one point apart from the end of said catching portion at the maximum moving distance made by one leap of a flea has an illuminance of not less than 10 (lux) effective for attracting fleas.

3. The apparatus for catching a flea as in claim 1 or 2, wherein said light source comprises a high brightness-light emitting diode and light from said high brightness-light emitting diode has a luminous intensity of not less than 0.3 cd and a main wavelength of from 400 to 600 nm.

4. A method for catching a flea, which comprises a step of preparing a light source and a catching means, a step of emitting light effective for attracting fleas from said light source, a step of irradiating a flea catching zone with light from said light source in such a manner that at least one point apart from an end of said catching means at the maximum moving distance made by one leap of a flea has an illuminance of not less than 10 lux effective for attracting fleas, and a step of catching fleas which have been attracted to light from said light source by said catching means.

5. The method for catching a flea as in claim 4, which comprises a step of allowing light from said light source to be reflected by a reflective surface, and a step of irradiating the flea catching zone with light from said light source and light reflected by said reflective surface in such a manner that at least one point apart from the end of said catching means at the maximum moving distance made by one leap of a flea has an illuminance effective for attracting fleas.

6. The method for catching a flea as in claim 4 or 5, wherein said light source comprises a high brightness-light emitting diode and light from said high brightness-light emitting diode has a luminous intensity of not less than 0.3 cd and a main wavelength of from 400 to 600 nm.

* * * * *